(12) United States Patent
Legerton et al.

(10) Patent No.: US 7,543,936 B2
(45) Date of Patent: Jun. 9, 2009

(54) HYBRID CONTACT LENS SYSTEM AND METHOD OF FITTING

(75) Inventors: Jerome A. Legerton, San Diego, CA (US); Barry Chen, San Diego, CA (US); Joe Collins, Carlsbad, CA (US)

(73) Assignee: Synergeyes, Inc., Carlsbad, CA (US)

( * ) Notice: Subject to any disclaimer, the term of this patent is extended or adjusted under 35 U.S.C. 154(b) by 80 days.

(21) Appl. No.: 11/123,876

(22) Filed: May 6, 2005

(65) Prior Publication Data

US 2006/0250576 A1 Nov. 9, 2006

(51) Int. Cl.
*G02B 7/02* (2006.01)
(52) U.S. Cl. ............... 351/177; 351/160 R; 351/160 H
(58) Field of Classification Search .................. 351/177
See application file for complete search history.

(56) References Cited

U.S. PATENT DOCUMENTS

| | | | |
|---|---|---|---|
| 2,240,157 A | 4/1941 | Gagnen et al. |
| 3,594,074 A | 7/1971 | Rosen |
| 3,876,581 A | 4/1975 | Neogi |
| 3,933,411 A | 1/1976 | Winner et al. |
| 3,944,347 A | 3/1976 | Barkdoll et al. |
| 3,973,838 A | 8/1976 | Page |
| 4,093,361 A | 6/1978 | Erickson et al. |
| 4,121,885 A | 10/1978 | Erickson et al. |
| 4,166,255 A | 8/1979 | Graham |
| 4,171,878 A | 10/1979 | Kivaev et al. |
| 4,193,671 A | 3/1980 | Erickson et al. |
| 4,208,362 A | 6/1980 | Deichert et al. |
| 4,248,989 A | 2/1981 | Novicky |
| 4,420,228 A | 12/1983 | Humphrey |
| 4,701,288 A | 10/1987 | Cook et al. |
| 4,702,574 A | 10/1987 | Bawa |
| 4,787,732 A | 11/1988 | Siviglia |
| 4,869,587 A | 9/1989 | Breger |
| 4,874,561 A | 10/1989 | Spector |
| 4,952,045 A | 8/1990 | Stoyan |
| 5,114,628 A | 5/1992 | Hofer et al. |
| 5,198,867 A | 3/1993 | Campbell |
| 5,347,326 A | 9/1994 | Volk |
| 5,371,147 A | 12/1994 | Spinelli |
| 5,422,687 A | 6/1995 | Tanaka et al. |
| 5,433,898 A | 7/1995 | Thakrar et al. |
| 5,448,312 A | 9/1995 | Roffman et al. |

(Continued)

FOREIGN PATENT DOCUMENTS

EP    1 014 156 A    6/2000

(Continued)

OTHER PUBLICATIONS

Search Report in related PCT Application No. PCT/US04/36649, mailed Jun. 10, 2005.

(Continued)

*Primary Examiner*—Jessica T Stultz
(74) *Attorney, Agent, or Firm*—Knobbe, Martens Olson & Bear (57) ABSTRACT

A hybrid contact lens comprises a substantially rigid zone having a base curve and a substantially flexible hydrophilic portion coupled to the substantially rigid zone, wherein the substantially flexible portion has one of a plurality of radii.

17 Claims, 7 Drawing Sheets

U.S. PATENT DOCUMENTS

| | | | |
|---|---|---|---|
| 5,452,031 A | 9/1995 | Ducharme | |
| 5,570,142 A | 10/1996 | Lieberman | |
| 5,643,249 A | 7/1997 | Amano | |
| 5,662,706 A | 9/1997 | Legerton et al. | |
| 5,771,088 A | 6/1998 | Perrott | |
| 5,777,717 A * | 7/1998 | Martin et al. | 351/177 |
| 5,777,719 A | 7/1998 | Williams et al. | |
| 5,800,532 A | 9/1998 | Lieberman | |
| 5,800,744 A | 9/1998 | Munakata | |
| 5,807,381 A | 9/1998 | Lieberman | |
| 5,835,192 A | 11/1998 | Roffman et al. | |
| 5,872,613 A | 2/1999 | Blum et al. | |
| 5,880,809 A | 3/1999 | Lieberman et al. | |
| 5,923,397 A | 7/1999 | Bonafini, Jr. | |
| 5,929,969 A | 7/1999 | Roffman | |
| 5,949,521 A | 9/1999 | Williams | |
| 5,953,098 A | 9/1999 | Lieberman et al. | |
| 5,963,297 A * | 10/1999 | Reim | 351/160 R |
| 5,965,330 A | 10/1999 | Evans et al. | |
| 5,986,001 A | 11/1999 | Ingenito et al. | |
| 6,043,328 A | 3/2000 | Domschke et al. | |
| 6,050,687 A | 4/2000 | Bille et al. | |
| 6,082,856 A | 7/2000 | Dunn et al. | |
| 6,086,204 A | 7/2000 | Magnante | |
| 6,095,651 A | 8/2000 | Williams | |
| 6,120,147 A | 9/2000 | Vijfvinkel et al. | |
| 6,149,609 A | 11/2000 | Lieberman et al. | |
| 6,199,986 B1 | 3/2001 | Williams et al. | |
| 6,234,631 B1 | 5/2001 | Sarver et al. | |
| 6,241,355 B1 | 6/2001 | Barsky | |
| 6,270,221 B1 | 8/2001 | Liang et al. | |
| 6,271,914 B1 | 8/2001 | Frey | |
| 6,271,915 B1 | 8/2001 | Frey | |
| 6,280,435 B1 | 8/2001 | Odrich et al. | |
| 6,305,802 B1 | 10/2001 | Roffman et al. | |
| 6,325,509 B1 | 12/2001 | Hodur et al. | |
| 6,338,559 B1 | 1/2002 | Williams et al. | |
| 6,340,229 B1 | 1/2002 | Lieberman et al. | |
| 6,379,005 B1 | 4/2002 | Williams et al. | |
| 6,379,008 B1 | 4/2002 | Chateau et al. | |
| 6,412,946 B1 | 7/2002 | Vijfvinkel et al. | |
| 6,416,179 B1 | 7/2002 | Lieberman et al. | |
| 6,540,353 B1 | 4/2003 | Dunn | |
| 6,599,285 B1 | 7/2003 | Lieberman et al. | |
| 7,018,039 B2 * | 3/2006 | Legerton et al. | 351/160 R |
| 7,097,301 B2 | 8/2006 | Legerton | |
| 7,104,648 B2 | 9/2006 | Dahi et al. | |
| 7,163,292 B2 | 1/2007 | Dahi et al. | |
| 7,377,637 B2 | 5/2008 | Legerton et al. | |
| 7,380,937 B2 | 6/2008 | Ye et al. | |
| 2002/0060776 A1 | 5/2002 | Hodur et al. | |
| 2003/0123024 A1 | 7/2003 | Dunn | |
| 2005/0018130 A1 | 1/2005 | Dahi et al. | |
| 2007/0082563 A1 | 4/2007 | Legerton et al. | |
| 2007/0273825 A1 | 11/2007 | Legerton et al. | |

FOREIGN PATENT DOCUMENTS

| | | |
|---|---|---|
| GB | 0 655 901 A | 8/1951 |
| GB | 1417650 | 12/1975 |
| JP | 04-045420 | 2/1992 |
| WO | WO 94/06621 A1 | 3/1994 |
| WO | WO 01/28410 A1 | 4/2001 |
| WO | WO 01/89424 A1 | 11/2001 |
| WO | WO 02/30273 A1 | 4/2002 |

OTHER PUBLICATIONS

Search Report in related PCT Application No. PCT/US05/04368, mailed Sep. 20, 2005.

Search Report in related European Application No. EP 03 79 4619, mailed Oct. 14, 2005.

Internatinal Search Report in PCT Appliction PCT/US2006/014950, mailed Jul. 25, 2006, 3 pages.

Office Action in co-pending U.S. Appl. No. 11/249,126, mailed Oct. 3, 2007.

International Search Report in PCT Application PCT/US06/039121, mailed Jan. 29, 2007.

* cited by examiner

HYBRID CONTACT LENS SYSTEM AND METHOD OF FITTING

CROSS-REFERENCE TO RELATED APPLICATIONS

This application is related to U.S. application Ser. No. 10/841,726, filed May 6, 2004 and U.S. application Ser. No. 10/865,462, filed Jun. 9, 2004, the contents of which are hereby incorporated by reference in their entirety and should be considered a part of this specification.

BACKGROUND

1. Field of the Invention

The present invention generally relates to hybrid contact lenses. More particularly, the present invention relates to hybrid hard-soft contact lenses having central zones with a base curve radius and peripheral skirt zones with varying skirt radii.

2. Description of the Related Art

Vision correction is on the verge of a revolution. New technologies to measure the aberrations or distortions in the optics of the eye will soon be available to the public. These new wavefront measurement techniques such as Shack-Hartmann wavefront sensing or Talbot Interferometry can precisely measure the eye's aberrations so that vision may be corrected up to 20/10. Wavefront sensing is the method for rapidly, and very accurately, assessing the aberrations in an individual's eye to create a customized prescription for correction.

However, once the eye's aberrations have been measured, either by conventional methods or by wavefront sensing, these measurements must then be transferred into a vision correction system, such as eye surgery, spectacles, or contact lenses. Recent advances in laser refractive surgery techniques such as LASIK and photorefractive keratectomy, as well as improvements in spectacle lens manufacturing now enable the creation of highly accurate corrective prescriptions for individuals.

However, this is not the case with contact lenses. Popular soft contact lenses cannot achieve the same result as spectacles or laser refractive surgery because of dimensional variations in fabrication. Hard contact lenses, which may provide the platform to achieve the results of spectacles, are not as comfortable as soft contacts and lack the necessary positional stability on the eye.

Hybrid hard-soft contact lenses comprising a hard center portion and a relatively soft outer skirt have been developed to provide a platform for a corrective prescription and also provide the comfort of soft contact lenses. One drawback associated with such hybrid hard-soft contact lenses concerns a lack of a smooth transition between the soft and hard portions. Another drawback involves a lack of bonding strength between the soft and hard portions.

Hybrid contact lenses having a rigid center and a soft peripheral skirt were commercialized previously. However, the only commercialized hybrid contact lens products have a design where the rigid center portion has a spherical base curve defined by a base curve radius, and the outer skirt has a skirt radius that is a constant amount longer than the base curve radius. That is, for more than 20 years, available hybrid contact lens designs have had one skirt radius for a given base curve radius. For example, standard hybrid contact lenses generally have a skirt radius approximately 1.3 mm longer than the base curve radius of the contact lens. Additionally, hybrid contact lenses designs for eyes in keratoconus generally have a skirt radius approximately 1.5 mm longer than the base curve radius of the contact lens. However, there is a wide distribution of corneal geometric diversity in the population of eyes intended for treatment with contact lenses. For example, the sagittal depth of naturally occurring normal corneas varies as a function of the apical radius of curvature, eccentricity, overall corneal diameter and radius of curvature of the sclera. Moreover, the cornea in keratoconus is highly aspheric and asymmetrical. Accordingly, there is a need for an improved hybrid contact lens design to better fit the diverse population of eyes intended for treatment with contact lenses.

SUMMARY

One aspect of at least one of the embodiments disclosed herein includes the realization that hybrid contact lenses having a substantially rigid central portion and a substantially flexible peripheral skirt can be designed to have more than one skirt radius for a given base curve radius in order to better fit the distribution of corneal geometric diversity found in the population of eyes intended for treatment.

In accordance with one embodiment, a method of manufacturing hybrid contact lenses is provided. The method comprises forming a first hybrid contact lens comprising a first substantially rigid zone having a first base curve and a first substantially flexible portion coupled to the first substantially rigid zone. The first substantially flexible portion has a first radius of curvature defining a curvature different than said first base curve. The method also comprises forming a second hybrid contact lens comprising a second substantially rigid zone having a second base curve and a second substantially flexible portion coupled to the second substantially rigid zone. The second substantially flexible portion has a second radius of curvature defining a curvature different than said second base curve. The first base curve and the second base curve of the first and second substantially rigid zones of the respective first and second hybrid contact lenses are substantially the same, and the first and second radii of curvature of said respective first and second hybrid contact lens flexible portions are different.

In accordance with another embodiment, a hybrid contact lens is provided, comprising a substantially rigid zone having a first curvature defined by a first radius of curvature between about 7.2 and 10.0 millimeters. A substantially flexible portion couples to the substantially rigid zone, the substantially flexible portion having a second radius of curvature, wherein the difference between the first and the second radii of curvature is greater than 0 and greater or less than 1.3 millimeters.

In accordance with another embodiment, a hybrid contact lens is provided, comprising a substantially rigid zone having a first curvature defined by a first radius of curvature between about 5.7 and 7.1 millimeters. A substantially flexible portion couples to the substantially rigid zone, the substantially flexible portion having a second radius of curvature, wherein the difference between the first and the second radii of curvature is greater or less than about 1.4 millimeters.

In accordance with another embodiment, a pair of hybrid contact lenses is provided. A left hybrid contact lens comprises a first substantially rigid zone having a first base curve and a first substantially flexible portion coupled to the first substantially rigid zone. The first substantially flexible portion has a first radius of curvature defining a curvature different than said first base curve. A right hybrid contact lens comprises a second substantially rigid zone having a second base curve and a second substantially flexible portion coupled to the second substantially rigid zone. The second substantially flexible portion has a second radius of curvature defining a curvature different than said second base curve. The first base curve and the second base curve of the first and second substantially rigid zones of the respective left and right hybrid contact lenses are substantially the same, and the first and second radii of curvature of said respective left and right hybrid contact lens flexible portions are different.

In accordance with another embodiment, a method of manufacturing hybrid contact lenses is provided. The method comprises forming a first hybrid contact lens comprising a first substantially rigid zone having a first base curve and a first substantially flexible portion coupled to the first substantially rigid zone. The first base curve is aspheric and the first substantially flexible portion has a first curvature different than said first base curve. The method also comprises forming a second hybrid contact lens comprising a second substantially rigid zone having a second base curve and a second substantially flexible portion coupled to the second substantially rigid zone. The second base curve is aspheric and the second substantially flexible portion has a second curvature different than said second base curve. The first base curve and the second base curve of the first and second substantially rigid zones of the respective first and second hybrid contact lenses are substantially the same, and the first and second curvatures of said respective first and second hybrid contact lens flexible portions are different.

In accordance with another embodiment, a kit for fitting a hybrid contact lens is provided. The kit comprises a first contact lens having a substantially rigid zone with a first base curve and a substantially flexible portion coupled to the substantially rigid zone. The substantially flexible portion has a first radius of curvature defining a curvature different from the first base curve. The kit also comprises a second contact lens having a second substantially rigid zone with a second base curve and a substantially flexible portion coupled to the substantially rigid zone. The substantially flexible portion has a second radius of curvature defining a curvature different from the second base curve. The first and second base curves are substantially the same and the first and second radii of curvature of the respective first and second contact lenses are different.

In accordance with another embodiment, a kit for fitting a hybrid contact lens is provided. The kit comprises a first contact lens having a substantially rigid zone with a first base curvature and a first rigid overall diameter, and a substantially flexible portion coupled to the substantially rigid zone. The substantially flexible portion has a different curvature than the first base curvature, the substantially rigid zone and substantially flexible portion together defining a first lens overall diameter. The kit also comprises a second lens having a second substantially rigid zone with a second base curvature and a second rigid overall diameter, and a substantially flexible portion coupled to the substantially rigid zone. The substantially flexible portion has a different curvature than the second base curvature, the substantially rigid zone and substantially flexible portion together defining a second lens overall diameter. The first base curvature and the second base curvature are substantially the same and the second rigid overall diameter is smaller than the first rigid overall diameter.

In accordance with another embodiment, a kit for fitting a hybrid contact lens is provided. The kit comprises a first contact lens having a substantially rigid zone with a first base curvature and a first rigid overall diameter, and a substantially flexible portion coupled to the substantially rigid zone. The substantially flexible portion has a curvature that is substantially the same as said first base curvature, the substantially rigid zone and substantially flexible portion together defining a first lens overall diameter. The kit also comprises a second contact lens having a second substantially rigid zone with a second base curvature and a second rigid overall diameter, and a substantially flexible portion coupled to the substantially rigid zone. The substantially flexible portion has a curvature that is substantially the same as said second base curvature, the substantially rigid zone and substantially flexible portion together defining a second lens overall diameter. The first base curvature and the second base curvature are substantially the same and the second rigid overall diameter is smaller than the first rigid overall diameter.

In accordance with another embodiment, a hybrid contact lens is provided comprising a substantially rigid zone having a base curve and thickness. A substantially flexible portion couples to a perimeter of said substantially rigid zone at a junction. The substantially flexible portion has a thickness substantially matching the thickness of substantially rigid zone at said junction, wherein the substantially flexible portion further comprises a sculpted portion having thickness less than said thickness at said junction and an edge portion having a thickness larger than said sculpted portion.

In accordance with another embodiment, a method of manufacturing hybrid contact lenses is provided. The method comprises forming a first hybrid contact lens comprising a first substantially rigid zone having a first base curve and a first substantially flexible portion coupled to the first substantially rigid zone. The first substantially flexible portion has a first radius of curvature defining a curvature different than said first base curve. The method also comprises forming a second hybrid contact lens comprising a second substantially rigid zone having a second base curve and a second substantially flexible portion coupled to the second substantially rigid zone. The second substantially flexible portion has a second radius of curvature defining a curvature different than said second base curve. The first base curve and the second base curve of the respective first and second substantially rigid zones are different, and the first and second radii of curvature of said respective first and second substantially flexible portions are substantially the same.

In accordance with another embodiment, a method of fitting a patient with hybrid contact lenses is provided. The method comprises selecting a first hybrid contact lens having a first substantially rigid zone with a first base curve and a first substantially flexible portion coupled to the first substantially rigid zone. The first substantially flexible portion has a first radius of curvature defining a curvature different than said first base curve. The method also comprises selecting a second hybrid contact lens having a second substantially rigid zone with a second base curve and a second substantially flexible portion coupled to the second substantially rigid zone. The second substantially flexible portion has a second radius of curvature defining a curvature different than said second base curve. The first base curve and the second base curve of the respective first and second substantially rigid zones are substantially the same, and the first and second radii of curvature of said respective first and second substantially flexible portions are different. The method also comprises choosing one of the first and second hybrid contact lenses based on which provides the better fit.

In accordance with another embodiment, a method of fitting a patient with hybrid contact lenses is provided. The method comprises selecting a first hybrid contact lens having a substantially rigid zone with a first base curvature and a first rigid overall diameter, and a substantially flexible portion coupled to the substantially rigid zone. The substantially flexible portion has a different curvature than the first base curvature, the substantially rigid zone and substantially flexible portion together defining a first lens overall diameter. The method also comprises selecting a second hybrid contact lens having a second substantially rigid zone with a second base curvature and a second rigid overall diameter, and a second substantially flexible portion coupled to the substantially rigid zone. The second substantially flexible portion has a different curvature than the second base curvature, the second substantially rigid zone and second substantially flexible portion together defining a second lens overall diameter. The first base curvature and the second base curvature are substantially the same, and the second rigid overall diameter is smaller than the first rigid overall diameter. The method also comprises choosing one of the first and second hybrid contact lenses based on which provides the better fit.

In accordance with another embodiment, a kit for fitting a hybrid contact lens is provided. The kit comprises a first hybrid contact lens having a substantially rigid zone with a first base curve and a substantially flexible portion coupled to the substantially rigid zone at a junction having a first thickness. The first hybrid contact lens has a first power. The kit also comprises a second hybrid contact lens having a second substantially rigid zone with a second base curve and a substantially flexible portion coupled to the second substantially rigid zone at a second junction having a second thickness. The second hybrid contact lens has a second power different from the first power, wherein the first and second thicknesses are substantially the same.

DETAILED DESCRIPTION OF CERTAIN PREFERRED EMBODIMENTS

In the following detailed description, terms such as "curve," "curvature" and "curved surface" are interchangeable. Likewise, descriptive terms such as "substantially rigid" and "hard" and "substantially flexible" and "soft" are used interchangeably. Similarly, terms of sequence, such as "first" and "second," are used to simplify the description of the illustrated embodiments. Because other sequences are possible, however, the present invention should not be limited to the illustrated embodiments.

Figure 1:
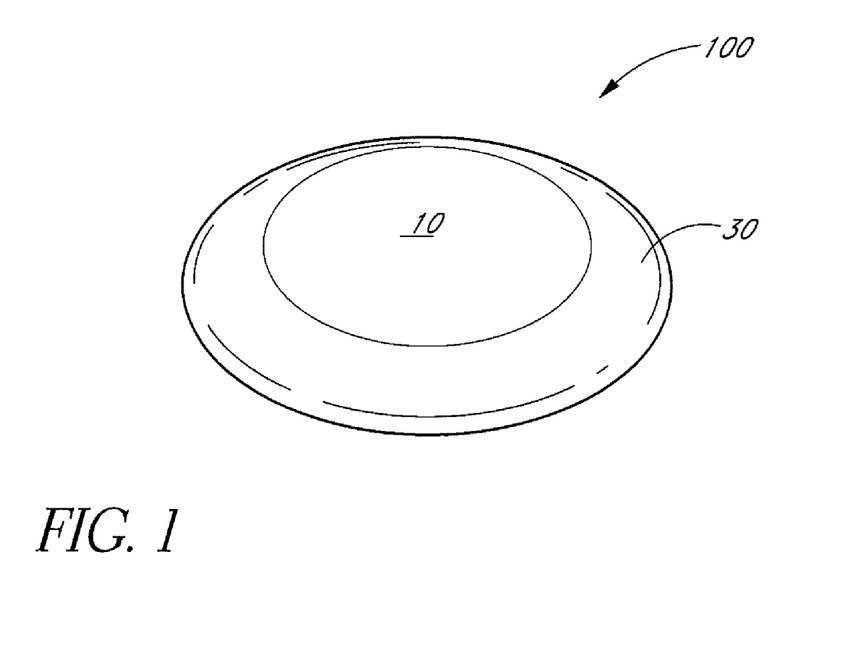
FIG. 1 is a perspective schematic view of one embodiment of a hybrid contact lens described herein.
Figure 2:
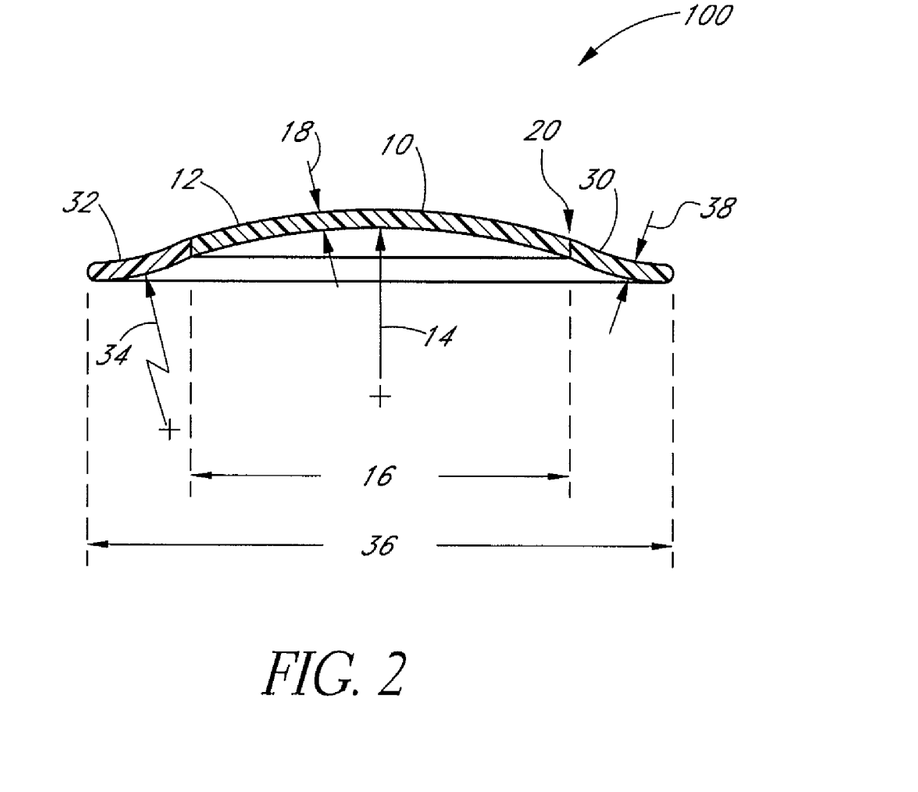
FIG. 2 is a cross-sectional side view of one embodiment of a hybrid contact lens disclosed herein.

FIGS. 1 and 2 illustrate one embodiment of a hybrid contact lens 100. The hybrid contact lens 100 preferably has a substantially rigid portion 10. This portion may be substantially cross-linked to reduce or avoid flexure, which may result in astigmatism or other aberrations. Preferably, the substantially rigid portion 10 is gas permeable and is defined by a first curvature or curved surface 12. In a preferred embodiment, the substantially rigid portion 10 is the central portion (i.e., hard center) of the hybrid contact lens 100. In at least one embodiment, the substantially rigid portion has a DK greater than about $30 \times 10^{-11}$ [$cm^3$/sec][ml $O_2$/ml mm Hg]. However, the DK should not be so limited as values outside this range are possible in other embodiments.

The first curvature 12 or base curve extends from an apex to two ends. In the illustrated embodiment, the base curve 12 is defined by a base curve radius 14 so that the base curve 12 has a generally spherical configuration. In one embodiment, the base curve radius 14 has a length of between about 5.0 mm and about 10.5 mm, for example about 7.70 mm. The base curve 12 also defines a diameter of the substantially rigid portion or rigid overall diameter 16, which extends between the ends of the base curve 12. In one embodiment, the rigid overall diameter 16 has a length of between about 5.0 mm and about 12.0 mm, for example about 8.5 mm. In the illustrated embodiment, the substantially rigid portion 10 preferably has a thickness 18 that is generally uniform along the base curve 12. In one embodiment, the thickness 18 is preferably between about 0.05 mm and about 0.35 mm, for example about 0.20 mm. In other embodiments, the thickness 18 can taper from the apex to the ends of the substantially rigid portion 10. However, one of ordinary skill in the art will recognize that the thickness 18 can have a variety of suitable configurations.

The ends of the base curve 12 serve as a junction 20 via which the substantially rigid portion 10 of the hybrid contact lens 100 is bonded to a substantially flexible portion or soft skirt 30, as shown in FIG. 2. Methods for bonding a substantially rigid portion to a substantially flexible portion in a hybrid contact lens are further discussed in U.S. application Ser. No. 10/865,462, filed Jun. 9, 2004, identified above, the contents of which are hereby incorporated by reference in their entirety and should be considered a part of this specification.

The flexible portion 30 has a relatively low modulus, for example, compared to the rigid portion 10. In a preferred embodiment, the soft skirt 30 is a hydrophilic peripheral skirt that extends from the ends 20 of the substantially rigid portion 10. The flexible portion 30 may comprise, for example, a non-cross-linked, gas permeable material that may be thermally formed. In another embodiment, the flexible portion 30 can be cast. In still another embodiment, the flexible portion 30 can be polymerized. In certain embodiments, the flexible portion 30 may comprise a hydrogel.

The soft skirt 30 is preferably defined by a second curvature or curved surface 32. In one embodiment, the second curvature 32 is defined by a skirt radius 34 having a length of between about 7.0 mm and about 11.0 mm, for example about 9.0 mm. In the illustrated embodiment, the skirt radius 34 is greater than the base curve radius 14.

The soft skirt 30 also has a skirt thickness 38. In a preferred embodiment, the skirt thickness 38 is generally uniform throughout the soft skirt 30. In one embodiment, the thickness 38 has a length of between about 0.04 mm and about 0.28 mm, for example about 0.12 mm. However, in other embodiments, the skirt thickness 38 can vary along the soft skirt 30. In one embodiment, the skirt thickness 38 can taper from the junction 20 to the ends of the skirt 30. In another embodiment, the thickness 38 can be sculpted, as further discussed below. The soft skirt 30 and the hard center 10 define an overall lens diameter 36 extending between the ends of the soft skirt 30. In one embodiment, the overall lens diameter 36 has a length of between about 10.0 mm and about 19.0 mm, for example about 14.5 mm.

The hard center 10 and soft skirt 30 of the hybrid contact lens 100 can be made of materials suitable for use in hybrid contact lenses. Additionally, the hybrid contact lens 100 can be manufactured using any suitable method for making hybrid contact lenses. Further discussion of such materials and methods of manufacture are provided in U.S. application Ser. No. 10/841,726, filed May 6, 2004, identified above, the contents of which are hereby incorporated by reference in their entirety and should be considered a part of this specification.

Figure 3:
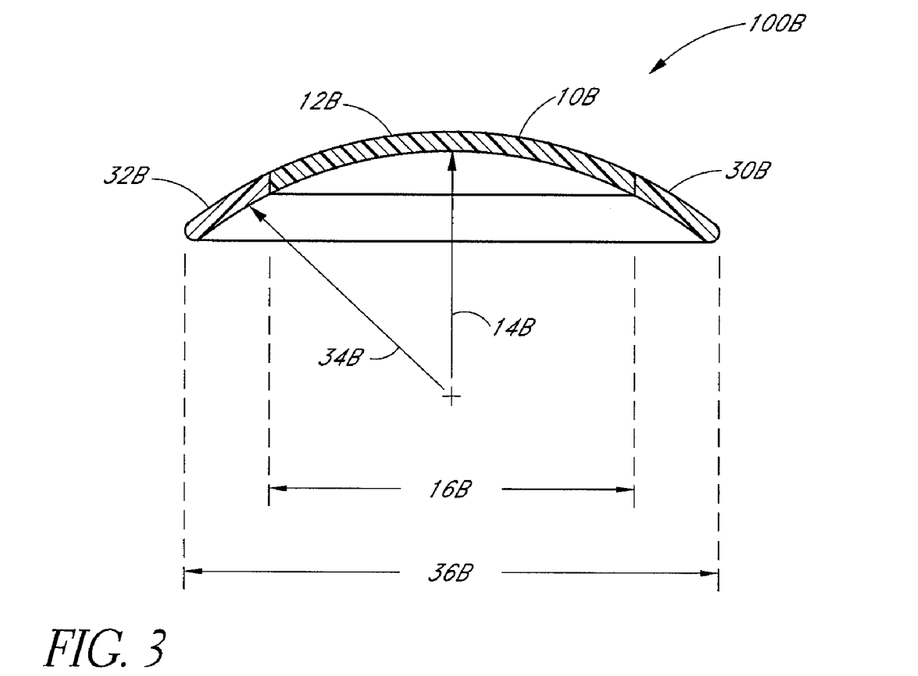
FIG. 3 is a side view of another embodiment of a hybrid contact lens.

FIG. 3 illustrates a cross-sectional side view of another embodiment of a hybrid contact lens 100B. The hybrid contact lens 100B illustrated in FIG. 3 is constructed similar to the hybrid contact lens 100 shown in FIG. 2, except as noted below. Thus, the reference numerals used to designate the various components of the hybrid contact lens 100B are identical to those used for identify the corresponding components of the contact lens 100 in FIG. 2, except that a ("B") has been added to the reference numerals.

As shown in FIG. 3, the substantially rigid portion 10B of the hybrid contact lens 100B has a base curve 12B defined by a base curve radius 14B and the substantially flexible portion 30B has a secondary curve 32B defined by a skirt radius 34B. In the illustrated embodiment, the skirt radius 34B and the base curve radius 14B have the same length, so that the substantially rigid portion 10B and the substantially flexible portion 30B have the same spherical shape.

Figure 4:
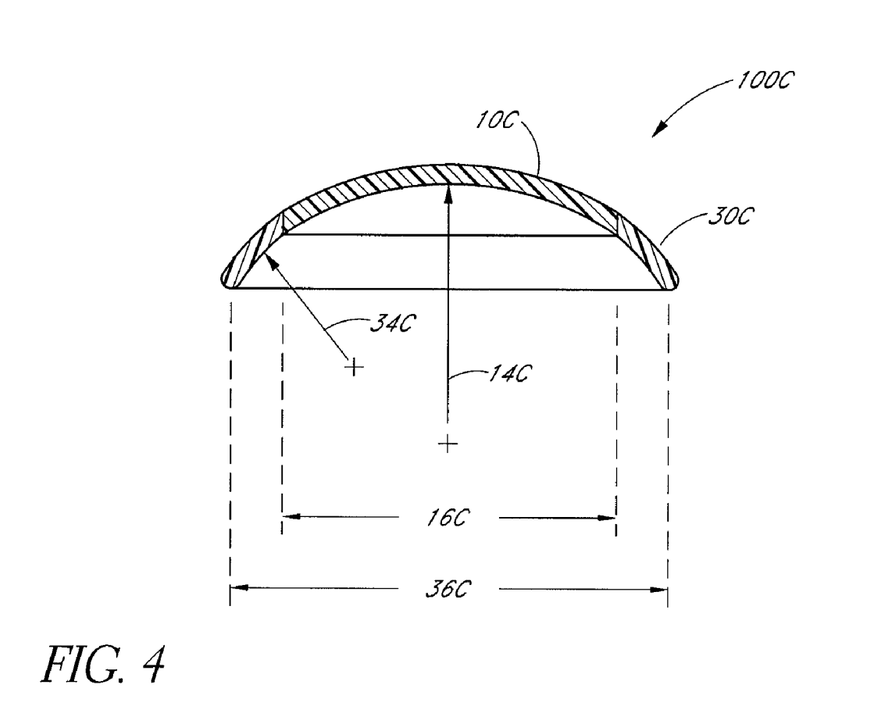
FIG. 4 is a side view of another embodiment of a hybrid contact lens.

FIG. 4 illustrates a cross-sectional side view of another embodiment of a hybrid contact lens 100C. The hybrid contact lens 100C illustrated in FIG. 4 is constructed similar to the hybrid contact lens 100 shown in FIG. 2, except as noted below. Thus, the reference numerals used to designate the various components of the hybrid contact lens 100C are identical to those used for identifying the corresponding components of the hybrid contact lens 100 in FIG. 2, except that a ("C") has been added to the reference numerals.

In the illustrated embodiment, the hybrid contact lens 100C has a substantially rigid portion 10C having a base curve radius 14C. The substantially rigid portion 10C is bonded to a substantially flexible portion 30C having a skirt radius 34C. In the illustrated embodiment, the skirt radius 34C is shorter than the base curve radius 14C.

Figure 5A:
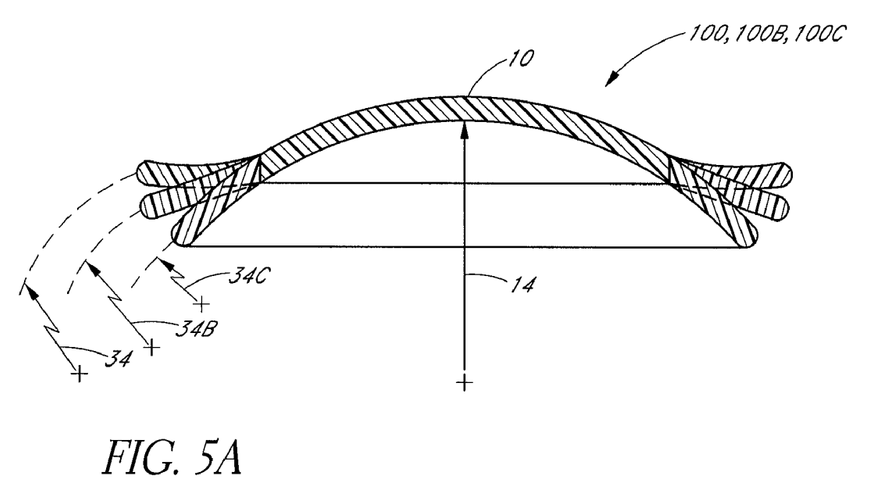
FIG. 5A is a cross-sectional side view of the hybrid contact lenses shown in FIGS. 2-4, superimposed on each other.

As shown in FIG. 5A, which is a cross-sectional side view of the hybrid contact lenses 100, 100B, 100C in FIGS. 2-4 superimposed on each other, the hybrid contact lenses 100, 100B, 100C can have one of a plurality of skirt radii 34, 34B, 34C for a given base curve radius 14. As shown in FIG. 5A, at least one hybrid contact lens 100 can have a skirt radius 34 that is longer than the base curve radius 14. Similarly, at least one hybrid contact lens 100B can have a skirt radius 34B that has the same length as the base curve radius 14, and at least one hybrid contact lens 100C can have a skirt radius 34C that is shorter than the base curve radius 14. Though FIG. 5A illustrates three hybrid contact lenses 100, 100B, 100C, each having a different skirt radius 34, 34B, 34C, one of ordinary skill in the art will recognize that a series of any number of hybrid contact lenses can be provided, each having a different skirt radius. Such a series advantageously provides a way to better fit the distribution of corneal geometric diversity found in the population of eyes intended for treatment with contact lenses.

Figure 5B:
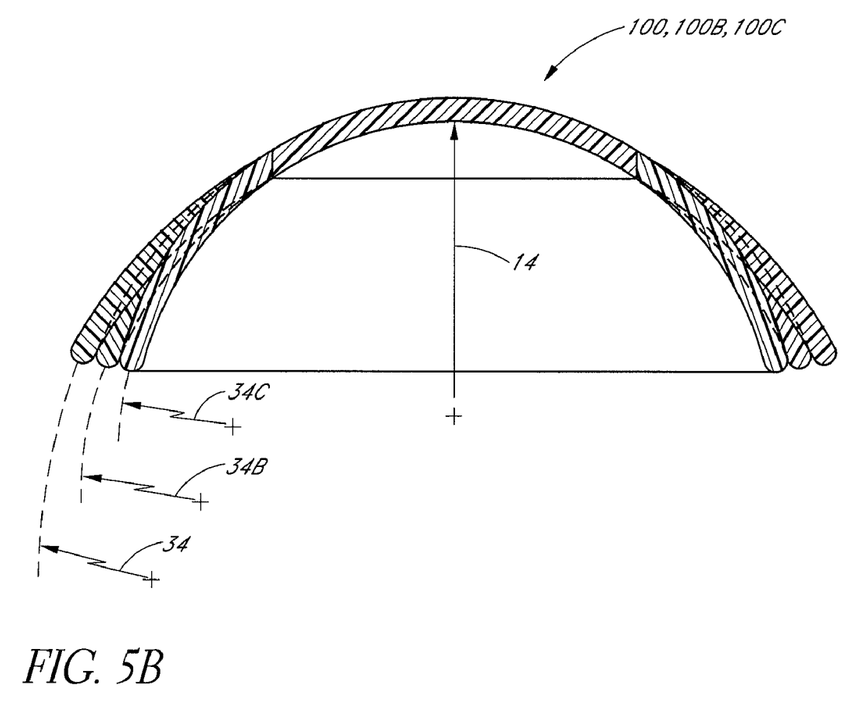
FIG. 5B is a cross-sectional side view of three other embodiments of hybrid contact lenses superimposed on each other.

Additionally, as shown in FIG. 5B, in one embodiment a series of hybrid contact lenses 100, 100B, 100C can have a plurality of skirt radii 34, 34B, 34C, where each has a length shorter than or equal to the base curve radius 14. Such a series can preferably be used to fit post-surgical corneas. In one preferred embodiment, the annular width of the substantially flexible portion is configured to cover at least a portion of the sclera of an eye when the hybrid contact lens 100, 100B, 100C is placed thereon. In one embodiment, the annular width is greater than about 1.5 mm. In another embodiment, the annular width of the substantially flexible portion is greater than about 3 mm.

Figure 6A:
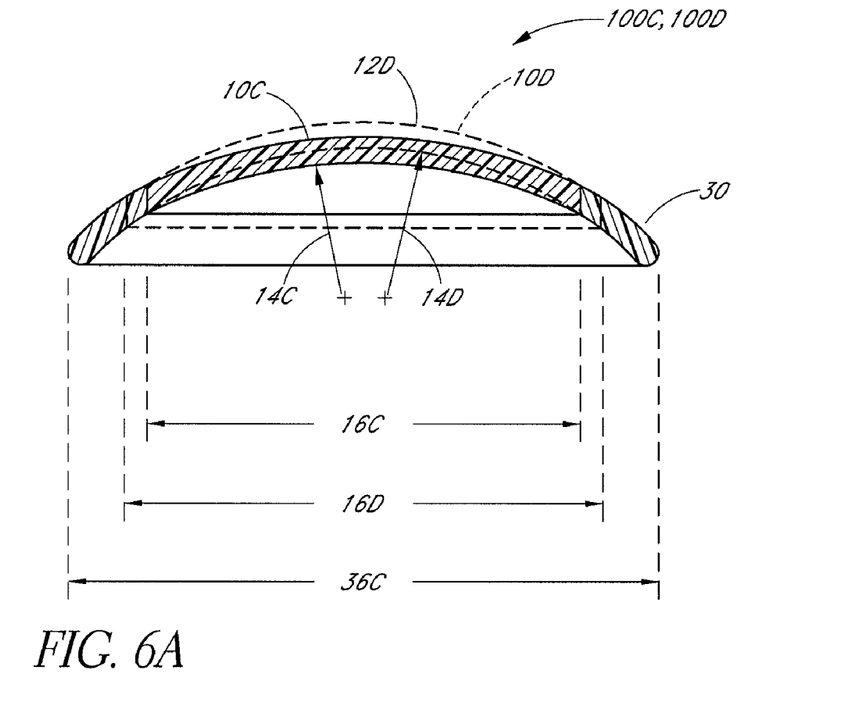
FIG. 6A is a cross-sectional side view of two other embodiments of a hybrid contact lens, superimposed on each other.
Figure 6B:
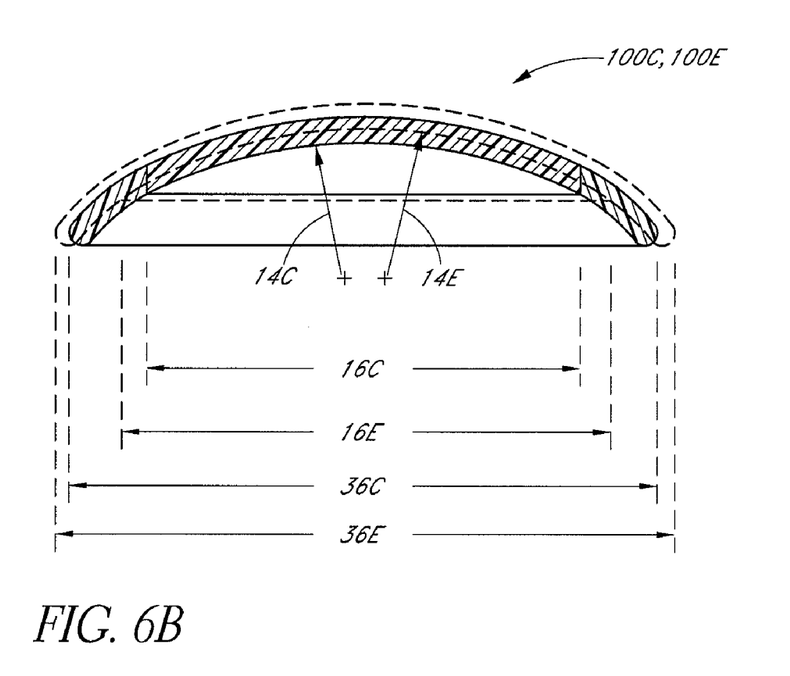
FIG. 6B is a cross-sectional side view of two other embodiments of a hybrid contact lens, superimposed on each other.

However, achieving a better fit with a hybrid contact lens is not limited to modulating the skirt radius or secondary curvature relative to the base curve radius or first curvature. In at least one embodiment, a series of hybrid contact lenses can be provided having a given base curve radius. Each of the contact lenses in the series can have a different rigid portion diameter relative to the lens overall diameter, as shown in FIG. 6A and further discussed below. In another embodiment, the lens overall diameter can also be modulated along with the rigid overall diameter, as shown in FIG. 6B and further discussed below. Said rigid overall diameter and less overall diameter modulation can be used in addition, or as an alternative to, modulation of the skirt radius of curvature between lenses, as described in the embodiments above.

FIG. 6A is a schematic cross-sectional side view of the hybrid contact lens 100C and a second hybrid contact lens 100D (shown as dashed line) superimposed on each other. The hybrid contact lens 100D illustrated in FIG. 6A is constructed similar to the hybrid contact lens 100C shown in FIG. 4, except as noted below. Thus, the reference numerals used to designate the various components of the hybrid contact lens 100D are identical to those used for identifying the corresponding components of the hybrid contact lens 100C in FIG. 4, except that a ("D") has been added to the reference numerals.

In the illustrated embodiment, the hybrid contact lens 100D has a substantially rigid portion 10D having a first curvature 12D defined by a base curve radius 14D that is substantially the same as the base curve radius 14C of the hybrid contact lens 100C. The hybrid contact lens 100D also has a rigid overall diameter 16D that is longer than the rigid overall diameter 16C of the hybrid contact lens 100C, while the lens overall diameter 36C of both lenses 100C, 100D are the same. Though, FIG. 6A only shows two hybrid contact lenses, one of ordinary skill in the art will recognize that any number of contact lenses can be provided having the same base curve radius, but each having a different rigid overall diameter. As seen in the illustrated embodiment, the hybrid contact lens 100D having the greater rigid overall diameter 16D provides an increased sagittal depth for the substantially rigid portion 10D (i.e., an increased perpendicular distance from the apex of the base curve to a line intersecting the ends of the soft skirt) relative to the sagittal depth provided by the hybrid contact lens 100C with the smaller rigid overall diameter 16C. The variation in rigid overall diameter in the illustrated embodiment is shown for a given lens overall diameter 36C and skirt radius of curvature. However, as discussed above, in other embodiments the lens overall diameter can also be varied. Likewise, in some embodiments the skirt radius of curvature can also be modulated.

FIG. 6B is a schematic cross-sectional side view of the hybrid contact lens 100C and a second hybrid contact lens 100E (shown as dashed line) superimposed on each other. The hybrid contact lens 100E illustrated in FIG. 6B is constructed similar to the hybrid contact lens 100C shown in FIG. 4, except as noted below. Thus, the reference numerals used to designate the various components of the hybrid contact lens 100E are identical to those used for identifying the corresponding components of the hybrid contact lens 100C in FIG. 4, except that a ("E") has been added to the reference numerals.

In the illustrated embodiment, the hybrid contact lens 100E has a substantially rigid portion 10E having a first curvature 12E defined by a base curve radius 14E that is substantially the same as the base curve radius 14C of the hybrid contact lens 100C. The hybrid contact lens 100E also has a rigid overall diameter 16E that is longer than the rigid overall diameter 16C of the hybrid contact lens 100C. Additionally, the hybrid contact lens 100E has a lens overall diameter 36E that is longer than the lens overall diameter 36C of the hybrid contact lens 100C. Though, FIG. 6B only shows two hybrid contact lenses, one of ordinary skill in the art will recognize that any number of contact lenses can be provided having the same base curve radius, but each having a different rigid overall diameter and different lens overall diameter. As seen in the illustrated embodiment, the hybrid contact lens 100E having the greater rigid overall diameter 16E provides an increased sagittal depth for the substantially rigid portion 10E relative to the sagittal depth provided by the hybrid contact lens 100C with the smaller rigid overall diameter 16C. The hybrid contact lens 100E also provides an increased coverage for larger corneal diameters relative to the coverage provided by the hybrid contact lens 100C. Said variation in rigid overall diameter and lens overall diameter in the illustrated embodiment is shown for a given skirt radius of curvature. However, as discussed above, in other embodiments the skirt radius of curvature can also be modulated.

Advantageously, the hybrid contact lens series having a larger rigid overall diameter and lens overall diameter could be used for eyes with a given corneal curvature, greater overall sagittal depth or larger corneal diameters. Similarly, the hybrid contact lens series having a smaller rigid overall diameter and lens overall diameter could advantageously be used for eyes with a given corneal curvature, shallower overall sagittal depth or smaller corneal diameters. Sagittal depth is a term of art. As used herein, the sagittal depth of a cornea refers to the perpendicular distance from the apex of the cornea to a line intersecting the edges of the cornea. As noted above, the sagittal depth of naturally occurring normal corneas varies as a function of the apical radius of curvature, eccentricity, overall corneal diameter and radius of curvature of the sclera. Similarly, the sagittal depth of a hybrid contact lens is the perpendicular distance from the apex of the base curve radius to a line intersecting the ends of the hybrid contact lens.

Figure 7:
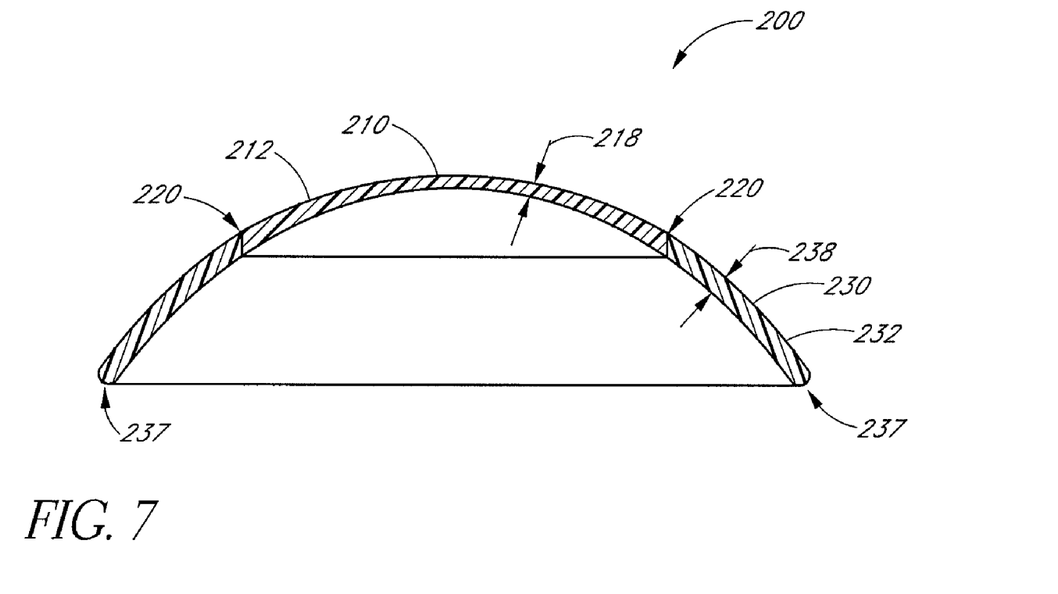
FIG. 7 is a cross-sectional side view of another embodiment of a hybrid contact lens having an aspheric base curve.

FIG. 7 illustrates another embodiment of a hybrid contact lens 200. The hybrid contact lens 200 has a substantially rigid portion 210 with a base curve 212. In the illustrated embodiment, the substantially rigid portion 210 has an aspheric configuration. Additionally, a substantially flexible portion 230 coupled to the substantially rigid portion 210 has a thickness 238 greater than a thickness 218 of the substantially rigid portion 210. In the illustrated embodiment, the substantially flexible portion 230 has a spherical configuration. In another embodiment, a portion of the substantially flexible portion 230 can have an aspheric configuration, and a portion of the substantially flexible portion 230 can have a spheric configuration. In another embodiment, the substantially flexible portion 230, or soft skirt, can have an aspheric configuration from a junction 220 with the substantially rigid portion 210 to the ends 237 of the substantially flexible portion 230. Advantageously, the illustrated embodiment of the hybrid contact lens can be used for the treatment of keratoconus, in which the cornea is highly aspheric and asymmetrical (e.g., not rotationally symmetric). The aspheric substantially rigid portion 210 may comprise a conic surface defined by a conic constant. In one embodiment, the aspheric substantially rigid portion 210 can be elliptical. In another embodiment, the aspheric substantially rigid portion 210 can have a curvature defined by a polynomial $a+bx+cx^2+dx^3 \ldots$ where a, b, c, d, are constants which may be zero Other aspheric curvatures including aspherics that are not rotationally symmetric about the optical axis are also possible.

Figure 8:
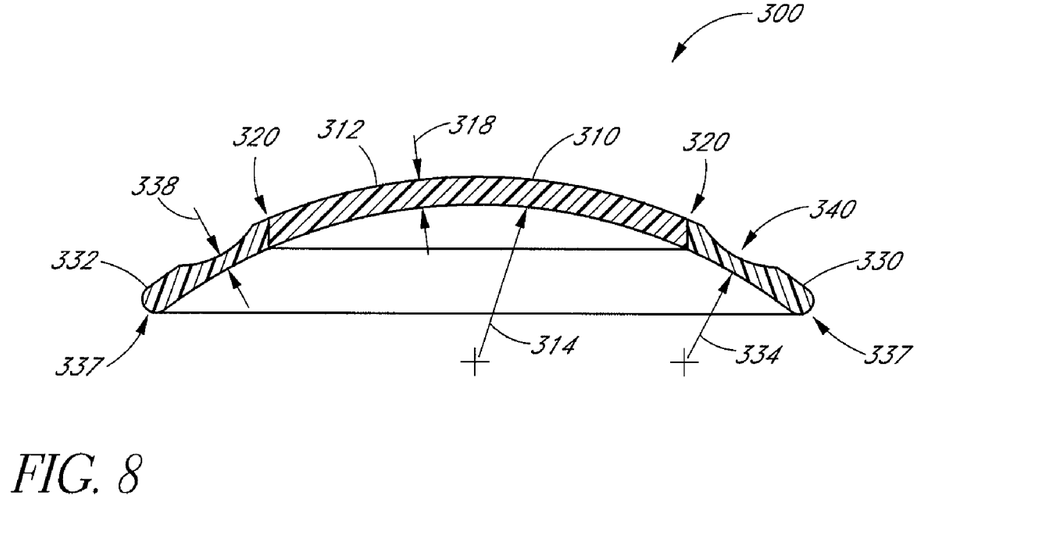
FIG. 8 is another embodiment of a hybrid contact lens having a sculpted substantially flexible portion.

FIG. 8 illustrates another embodiment of a hybrid contact lens 300. The hybrid contact lens 300 has a substantially rigid portion 310 coupled to a substantially flexible portion 330 at a junction 320. As with any of the embodiments disclosed above, the substantially flexible portion 330 is preferably hydrophilic. The substantially rigid portion 310 has a base curve 312 defined by a base curve radius 314 and the substantially flexible portion 330 has a secondary curvature 332 defined by a skirt radius 334. In the illustrated embodiment, the base curve radius 314 is equal to the skirt radius 334. However, as discussed above, the skirt radius 334 can vary for a given base curve radius 314.

As shown in FIG. 8, the substantially rigid portion 310 of the hybrid contact lens 300 preferably has a generally constant thickness 318 throughout the substantially rigid portion 310, except for the thickness variation to produce the desired lens power. The substantially flexible portion 330 preferably has a thickness at the junction 320 with the substantially rigid portion 310 that is equal to the thickness 318 of the substantially rigid portion 310. The substantially flexible portion 330 also has a sculpted section 340 along at least a portion thereof, wherein the thickness 338 of the substantially flexible portion 330 is less than the thickness 318 at the junction 320 with the substantially rigid portion 310. That is, the substantially flexible portion 330 is preferably a sculpted soft skirt 330. In one embodiment, the sculpted section 340 is configured to receive a portion of an eyelid in the closed position. Advantageously, as shown in the illustrated embodiment, the sculpted skirt 330 allows the use of a uniform thickness at the junction 320 to provide an optimum bonding surface and resultant strength. Additionally, the sculpted section 340 reduces the stiffness of the substantially flexible portion 330 without reducing the modulus of the material of the substantially flexible portion 330. Advantageously, the sculpted section 340 provides for increased oxygen transmission through the sculpted skirt 330. Additionally, the reduced stiffness of the sculpted soft skirt 330 allows for improved "draping" of the hybrid contact lens 300 on the eye and improved comfort to the wearer of the hybrid contact lens 300.

As illustrated in FIG. 8, the thickness 338 of the substantially flexible portion 330 at the ends 337 of the substantially flexible portion 330 is greater than the thickness 338 at the sculpted section 340. This configuration advantageously allows the hybrid contact lens 330 to retain an edge thickness and profile at a level necessary to optimize comfort and minimize lens tearing. Accordingly, the thickness 338 at the ends 337 of the sculpted soft skirt 330 is configured to improve the durability of the hybrid contact lens 300. In one preferred embodiment, the thickness 338 of the sculpted section 340 is reduced relative to the thickness 318 at the junction 320 with the substantially rigid portion 310 by an amount of between about 10% and about 90%, for example, about 50%. In another embodiment, the thickness 338 at the sculpted section 340 of the substantially flexible portion 330 is smaller than the thickness 318 at the junction 320 with the substantially rigid portion 310 by an amount of between about 0.02 mm and about 0.18 mm, for example, about 0.10 mm. One of ordinary skill in the art will recognize that the sculpted substantially flexible portion illustrated in FIG. 8 can be used in combination with any of the other embodiments disclosed herein.

Although not shown, the edge of the hybrid contact lens may be beveled as well. Accordingly, the edge may have a reduced or tapered thickness. This taper at the edge may be in addition to the sculpted portion shown in FIG. 8. The thickness may thus increase outward from the sculpted portion and then be reduced by tapering off at the edge. Other variations are also possible.

Figure 9:
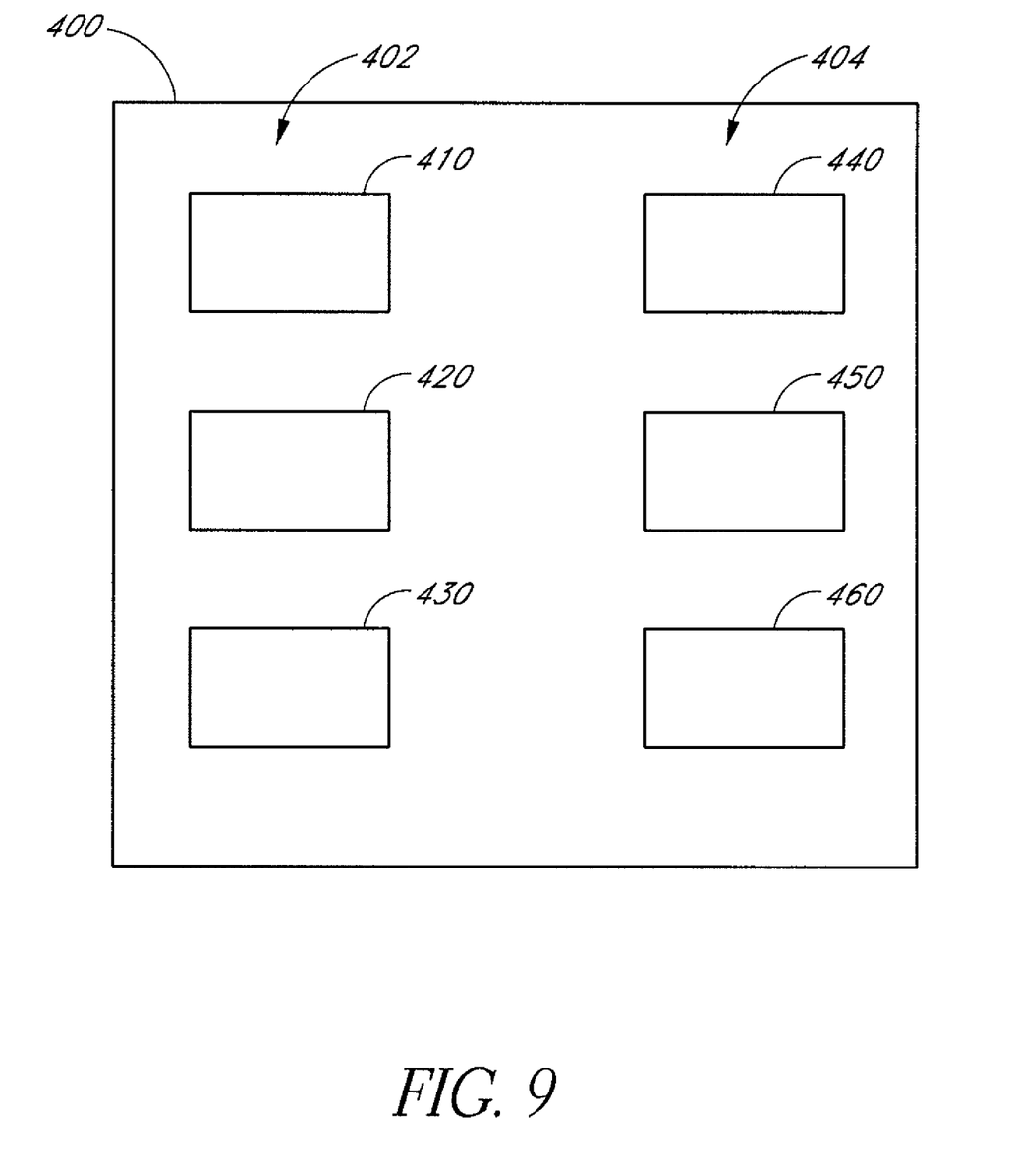
FIG. 9 is a schematic illustration of a kit of hybrid contact lenses, in accordance with the embodiments disclosed herein.

In practice, a practitioner may use a kit containing a series of contact lenses having some of the properties disclosed in the embodiments above. For example, FIG. 9 illustrates a schematic of a kit 400 for fitting hybrid contact lenses. The kit 400 includes a first series 402 of hybrid contact lenses 410, 420, 430 and a second series 404 of hybrid contact lenses 440, 450, 460. Though FIG. 9 only. shows two series 402, 404, each having three hybrid contact lenses, one of ordinary skill in the art will recognize that any number of series may be provided and that each series can include any number of contact lenses.

In the illustrated embodiment, the contact lenses 410, 420, 430 in the first series 402 can have a given base curve radius, wherein each of the contact lenses 410, 420, 430 has a different skirt radius for the substantially flexible portion, as discussed above. Each skirt radius can be one of a plurality of radii and vary from between about 7.0 mm to about 12.2 mm. Further, as discussed above, at least one of the contact lenses 410, 420, 430 can have a skirt radius that is longer than the base curve radius, a skirt radius that is equal to the base curve radius, or a skirt radius that is shorter than the base curve radius.

Similarly, the contact lenses 440, 450, 460 in the second series 404 can have a given base curve radius different than the base curve radius of the first series 402. Each of the contact lenses 440, 450, 460 preferably has a different skirt radius for the substantially flexible portion, as discussed above. Each skirt radius can be one of a plurality of radii, at least some of which may be the same as the skirt radii in the first series 402.

In one embodiment, the kit comprises twenty-four lenses. The twenty-four lenses comprise twelve different base curves having radii of curvature ranging from about 7.2 to 8.3 millimeters. A pair of lenses is provided for each of the twelve base curves. One of the lenses has a skirt radius that is 1.0 millimeter longer than the base curve radius, while another of the lenses has skirt radius that is 1.3 millimeters longer than the base curve radius.

Another kit suitable for patients with keratoconus also comprises twenty-four lenses. The twenty-four lenses comprise eight different base curves having radii of curvature ranging from about 5.7 to 7.1 millimeters. Three lenses are provided for each of the eight base curves. One of the lenses has a skirt radius that is 1.4 millimeters longer than the base curve radius, another of the lenses has skirt radius that is 2.1 millimeters longer than the base curve radius, while another of the lenses has skirt radius that is 2.8 millimeters longer than the base curve radius.

Variations in the lens parameters within a given kit are possible. For example, the number of lenses included in the kit may be more or less than twenty-four. The number of different base curvatures may vary. Similarly, a greater or lower number of different hybrid lenses with different skirts may be provided for each base curvature. The range of base curvatures and skirt curvatures may also vary. Still other variations are possible.

Another kit may be used for failed surgical procedures such as radial keratotomy or corneal transplant, wherein the patient is left with a cornea having a central portion that is relatively flat compared to peripheral portions of the cornea. Such hybrid contact lenses may have a base curve radius that is longer than the skirt radius of curvature. Such a kit may comprise a plurality of lenses having base curvatures ranging from about 8.3 to 10.5 millimeters. Multiple lenses may be provided for each of the base curves. One of the lenses may have a skirt radius that is about 0.1 millimeters shorter than the base curve radius, another of the lenses has skirt radius that is about 0.6 and another 1.2 millimeters shorter than the base curve radius. Other values are also possible.

In various preferred embodiments, each of the lenses in the kit has the same optical power. For example, the optical power of each of the twenty-four lenses in these examples may be −3 diopter. As discussed more fully below, the patient's prescription is determined by performing a refraction with the lens applied to the eye and combining the power of the lens applied to the patient's eye with the refraction, e.g., −3 diopters.

Lenses having a suitable power and a suitable base curvature and skirt size may be fabricated to provide proper fit. In various preferred embodiments, the thickness of the junction between the rigid and flexible portions is substantially constant regardless of the power of the lens. For example, a junction thickness of 0.2 millimeter could be maintained for hybrid lenses with powers ranging from +20.00 to −20.00 diopters. The lens power is provided by the curvature of the front surface of the hybrid lens. Variations in the power can be introduced by adjusting the curvature of the front or anterior surface of the rigid portion, referred to as the anterior first curvature. For example, in the case of a lens of positive power, the power may be increased by increasing the anterior first curvature. In this case, the rigid portion may comprise a central region referred to as the anterior optic zone (AOZ) having increased anterior curvature. This central anterior optic zone may be surrounded by an anterior second zone having curvature (e.g., spherical or aspheric) that is smaller than the curvature of central region (AOZ) of the rigid portion. This second zone permits the overall diameter of the rigid portion to be maintained or otherwise accommodated for different anterior first curvatures. Variation in power can thus be adjusted by varying the diameter of the anterior first curvature and the central thickness of the hybrid lens, with variations in the secondary zone providing a suitable overall diameter for the rigid portion. In this manner, the thickness of the junction can be maintained constant while providing the desired overall diameter of the hybrid lens. Advantageously, by maintaining the same junction thickness, a uniform bonding area can be provided for a plurality of lenses.

In alternative embodiments, however, the power and/or the junction thickness need not be the same for each of the lenses in the kit. Other variations are possible as well.

Figure 10:
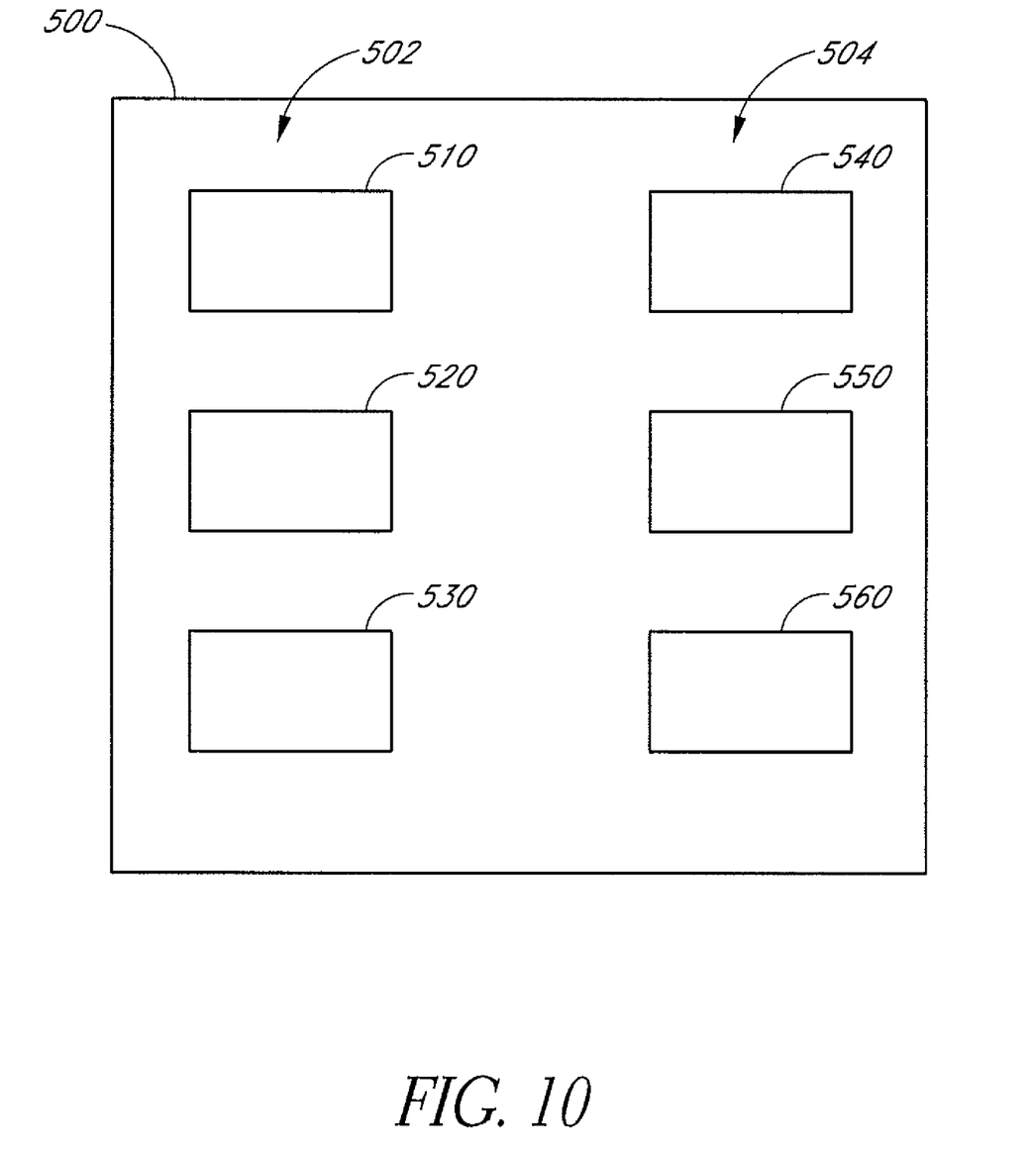
FIG. 10 is a schematic illustration another kit of hybrid contact lenses in accordance with the embodiments disclosed herein.

FIG. 10 illustrates a schematic of a kit 500 for fitting hybrid contact lenses. The kit 500 includes a first series 502 of hybrid contact lenses 510, 520, 530 and a second series 504 of hybrid contact lenses 540, 550, 560. Though FIG. 10 only shows two series 502, 504, each having three hybrid contact lenses, one of ordinary skill in the art will recognize that any number of series may be provided and that each series can include any number of contact lenses.

In the illustrated embodiment, the contact lenses 510, 520, 530 in the first series 502 can have a given base curve and secondary curvature, wherein each of the contact lenses 510,

520, 530 has a different rigid overall diameter and lens overall diameter, as discussed above. In one embodiment, at least one of the base curves of the contact lenses 510, 520, 530 can be aspheric.

Similarly, the contact lenses 540, 550, 560 in the second series 504 can have a given base curve and secondary curvature, different than the base curve and/or secondary curvature of the first series 502. Each of the contact lenses 540, 550, 560 preferably has a different rigid overall diameter and lens overall diameter, as discussed above. In one embodiment, at least one of the base curves of the contact lenses 510, 520, 530 can be aspheric. In one embodiment, the second series 504 can have greater rigid overall diameters and lens overall diameters than those of the first series 502. In one embodiment, the second series 504 can have smaller rigid overall diameters and lens overall diameters than those of the first series 502. In another embodiment, both series 502, 504 can have the same base curve radius.

In use, the practitioner can apply a contact lens from one of the series in the kit 400, 500 onto a patient's eye, for example during an examination to fit the patient with contact lenses. If the examination reveals for example that the patient's corneal curvature has greater overall sagittal depth or a larger corneal diameter, the practitioner can select an adequate contact lens from the series with a different skirt radius, or rigid overall diameter and lens overall diameter, that better fits the patient. Alternatively, the practitioner may choose a contact lens having a shorter rigid overall diameter and/or lens overall diameter to accommodate a patient's eye that has a given corneal curvature but shallower overall sagittal depth, or has a smaller corneal diameter. Additionally, the practitioner can use hybrid contact lenses from the series in the kit 400, 500 to fit each of the patient's eyes with a hybrid contact lens proper for each eye. For example, the patient's eyes may require a hybrid contact lens with the same base curve radius, but one of the patient's eyes may require a different skirt radius than the other. In another example, each of the patient's eyes may require a different base curve radius, as well as a different skirt radius. Accordingly, a practitioner can use said kits 400, 500 containing hybrid contact lenses with varying skirt radii for a given base curve radius, or varying rigid overall diameter, to better fit the full distribution of corneal geometric diversity found in the population of eyes intended for treatment with contact lenses.

The practitioner can use any number of acceptable methods for fitting a patient with hybrid contact lenses, using the kits 400, 500 discussed above. In one embodiment, the practitioner selects one of the hybrid contact lenses from one of the series in the kit 400, 500 having a given base curve radius. The practitioner applies a fluorescent dye, e.g., a sodium fluorescein dye, to a patient's eye and positions the chosen contact lens over the patient's eye. Under fluorescent light, the practitioner then evaluates the tear thickness under the hybrid contact lens in a manner known in the art. For example, if the fluorescent pattern (not shown) of the fluorescein containing tear fluid between the hybrid contact lens and the cornea of the patient's eye is green, the tear thickness is adequate (e.g., greater than about 20 microns). If the fluorescent pattern is black, the tear thickness is not adequate (e.g., less than about 20 microns). If the practitioner sees such a black fluorescent pattern, the practitioner would then select a different contact lens from the series having a shorter skirt radius, and consequently an increased sagittal depth. The proper fitting of a contact lens could be confirmed by the practitioner upon viewing a generally uniform green fluorescent pattern under the central region of the hybrid contact lens.

Too small a tear thickness (e.g., 8 to 10 microns) may result in excessively tight fit as a result of the hydrophobic surface attraction between the back surface of the rigid portion of the hybrid contact lens and the front surface of the cornea. Too large a tear thickness (e.g., 40 microns or larger) may result in scleral impingement causing indentations in the sclera and blanching of the subconjunctival blood vessels therein.

In another embodiment, the practitioner could gauge the proper fit of a contact lens taken from one series in the kit 400, 500 by evaluating the degree of impingement on the vasculature above the sclera of the patient's eye due to the selected hybrid contact lens. If excessive impingement occurred (e.g., if blanching of the vessels was exhibited), it would indicate that the hybrid contact lens has too steep a radius of curvature. Accordingly, the practitioner could then select another hybrid contact lens from the series having a greater skirt radius.

In another embodiment, the practitioner first measures the corneal curvature and the corneal diameter (i.e., "white-to-white" diameter) of the patient's eye and uses a look-up table using said measurements to determine the skirt radius needed. The practitioner could then select a hybrid contact lens from one of the series in the kit 400, 500 having said skirt radius and a base curve radius corresponding to the measured corneal curvature. The practitioner could then place said hybrid contact lens on the patient's eye and evaluate the fit.

The preferred hybrid contact lens would facilitate the peristaltic pumping of tear fluid under the contact lens during use. That is, upon blinking, the patient's eyelid would close and push the hybrid contact lens onto the eye, causing the flushing of tear fluid from between the hybrid contact lens and the cornea. Upon opening of the eyelid, the hybrid contact lens would lift off the eye, pulling tear fluid under the hybrid contact lens and into contact with the cornea. Accordingly, the preferred skirt radius would lift the hybrid contact lens off the cornea without impinging on the sclera.

Upon establishing the correct fit, the practitioner could determine the power needed by the patient's eye in order to complete the prescription. The practitioner combines the measured over-refraction with the known power of the diagnostic hybrid contact lens to determine the power needed by the patient.

The use of series of hybrid contact lenses having a variety of skirt radii for a given base curve radius, or alternatively a variety of rigid overall diameters and lens overall diameters for a given base curve radius, advantageously allow a practitioner to fit a patient with contact lenses suited for the specific corneal configuration of the patient's eyes, resulting in increased comfort to the patient. Advantageously, hybrid contact lenses in accordance with any of the embodiments discussed above provide practitioners with the ability to choose hybrid contact lenses having a base curve radius that conforms to the corneal curvature of the patient's eye, as well as the necessary sagittal depth to provide the peristaltic effect discussed above. With conventional hybrid contact lens, practitioners would misalign the central portion to improve fit, often resulting, however, in corneal molding. Fitting with too short a base curvature could result in discomfort caused by an overly tight fit, especially upon dehydration of the lens. If the hybrid contact lens was not fit tightly enough, edge lifting may result, also causing discomfort. Additionally, unlike with conventional hybrid contact lenses, the hybrid contact lenses in accordance with the embodiments discussed above are less susceptible to flexure of the substantially rigid portion upon action of the eyelid, since the skirt radius can be varied without varying the base curve radius. Flexure of the contact lens can introduce aberrations such as astigmatism and lead to reduced vision capabilities. Further, the proper fit obtained with the hybrid contact lenses discussed above advantageously facilitate their removal from a patient's eyes, resulting in increased comfort and reducing the incident of tearing the hybrid lens.

Of course, the foregoing description is that of certain features, aspects and advantages of the present invention to which various changes and modifications can be made without departing from the spirit and scope of the present invention. Moreover, the hybrid contact lens may not feature all objects and advantages discussed above to use certain features, aspects and advantages of the present invention. Thus, for example, those skilled in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed hybrid contact lens.

What is claimed is:

1. A method of manufacturing hybrid contact lenses, comprising:
    forming a first hybrid contact lens comprising a first substantially rigid zone having a first base curve and a first substantially flexible portion coupled to the first substantially rigid zone, the first substantially flexible portion having a first radius of curvature defining a curvature different than said first base curve; and
    forming a second hybrid contact lens comprising a second substantially rigid zone having a second base curve and a second substantially flexible portion coupled to the second substantially rigid zone, the second substantially flexible portion having a second radius of curvature defining a curvature different than said second base curve,
    wherein (a) the first base curve and the second base curve of the first and second substantially rigid zones of the respective first and second hybrid contact lenses are substantially the same and (b) the first and second radii of curvature of said respective first and second hybrid contact lens flexible portions are different, the first radius of curvature being longer than a first base curve radius that defines the first base curve.

2. The method of claim 1, wherein first substantially rigid zone has a diameter between about 4 and 12 millimeters.

3. The method of claim 1, wherein first substantially rigid zone and the first substantially flexible portion together provide a first overall lens diameter between about 12 and 18 millimeters.

4. The method of claim 1, wherein said first substantially flexible portion comprises hydrophilic material.

5. The method of claim 1, wherein the base curve is aspheric.

6. The method of claim 1, wherein the substantially first and second rigid zones have a DK greater than about $30\times10^{-11}$ [cm$^3$/sec][ml O$_2$/ml mm Hg].

7. A pair of hybrid contact lenses, comprising:
    a left hybrid contact lens comprising a first substantially rigid zone having a first base curve and a first substantially flexible portion coupled to the first substantially rigid zone, the first substantially flexible portion having a first radius of curvature defining a curvature different than said first base curve; and
    a right hybrid contact lens comprising a second substantially rigid zone having a second base curve and a second substantially flexible portion coupled to the second substantially rigid zone, the second substantially flexible portion having a second radius of curvature defining a curvature different than said second base curve,
    wherein (a) the first base curve and the second base curve of the first and second substantially rigid zones of the respective left and right hybrid contact lenses are substantially the same and (b) the first and second radii of curvature of said respective left and right hybrid contact lens flexible portions are different, the first radius of curvature being longer than a first base curve radius that defines the first base curve.

8. A method of manufacturing hybrid contact lenses, comprising:
    forming a first hybrid contact lens comprising a first substantially rigid zone having a first base curve and a first substantially flexible portion coupled to the first substantially rigid zone, the first base curve being aspheric, the first substantially flexible portion having a first curvature different than said first base curve; and
    forming a second hybrid contact lens comprising a second substantially rigid zone having a second base curve and a second substantially flexible portion coupled to the second substantially rigid zone, the second base curve being aspheric, the second substantially flexible portion having a second curvature different than said second base curve,
    wherein (a) the first base curve and the second base curve of the first and second substantially rigid zones of the respective first and second hybrid contact lenses are substantially the same and (b) the first and second curvatures of said respective first and second hybrid contact lens flexible portions are different, the first curvature having a radius of curvature longer than a radius of curvature of the first base curve.

9. The method of claim 8, wherein the first and second curvatures of the first and second substantially flexible portions are spherical.

10. The method of claim 8, wherein at least one of the first and second curvatures of the first and second substantially flexible portions is aspheric.

11. A kit for fitting a hybrid contact lens, comprising:
    a first contact lens having a substantially rigid zone with a first base curve and a substantially flexible portion coupled to the substantially rigid zone, the substantially flexible portion having a first radius of curvature defining a curvature different from the first base curve; and
    a second contact lens having a second substantially rigid zone with a second base curve and a substantially flexible portion coupled to the substantially rigid zone, the substantially flexible portion having a second radius of curvature defining a curvature different from the second base curve;
    wherein (i) the first and second base curves are substantially the same and (ii) the first and second radii of curvature of the respective first and second contact lenses are different, the first radius of curvature being longer than a first base curve radius that defines the first base curve.

12. The kit of claim 11, wherein the second base curve is defined by a radius of curvature shorter than said second radius of curvature of said substantially flexible portion.

13. A method of fitting a patient with hybrid contact lenses, comprising:
   selecting a first hybrid contact lens having a first substantially rigid zone with a first base curve and a first substantially flexible portion coupled to the first substantially rigid zone, the first substantially flexible portion having a first radius of curvature defining a curvature different than said first base curve;
   selecting a second hybrid contact lens having a second substantially rigid zone with a second base curve and a second substantially flexible portion coupled to the second substantially rigid zone, the second substantially flexible portion having a second radius of curvature defining a curvature different than said second base curve, the first base curve and the second base curve of the respective first and second substantially rigid zones being substantially the same and the first and second radii of curvature of said respective first and second substantially flexible portions being different, the first radius of curvature being longer than a first base curve radius that defines the first base curve; and
   choosing one of the first and second hybrid contact lenses based on which provides the better fit.

14. The method of claim 13, wherein choosing one of the first and second hybrid contact lenses includes evaluating a tear thickness between the selected hybrid contact lens and a patient's eye.

15. The method of claim 14, wherein evaluating said tear thickness includes introducing a fluorescent dye between the selected hybrid contact lens and the patient's eye and evaluating a fluorescent pattern generated by said dye.

16. The method of claim 13, wherein choosing one of the first and second hybrid contact lenses includes evaluating a degree of impingement on a sclera of a patient's eye caused by the selected hybrid contact lens.

17. A pair of hybrid contact lenses, comprising:
   a left hybrid contact lens comprising a first substantially rigid zone having a first base curve and a first substantially flexible portion coupled to the first substantially rigid zone, the first substantially flexible portion having a first radius of curvature defining a curvature different than said first base curve; and
   a right hybrid contact lens comprising a second substantially rigid zone having a second base curve and a second substantially flexible portion coupled to the second substantially rigid zone, the second substantially flexible portion having a second radius of curvature defining a curvature different than said second base curve,
   wherein prior to placement on a patient's eyes (a) the first base curve and the second base curve of the first and second substantially rigid zones of the respective left and right hybrid contact lenses are substantially the same and (b) the first and second radii of curvature of said respective left and right hybrid contact lens flexible portions are different, the first radius of curvature being longer than a first base curve radius that defines the first base curve.

* * * * *

UNITED STATES PATENT AND TRADEMARK OFFICE
CERTIFICATE OF CORRECTION

PATENT NO.      : 7,543,936 B2
APPLICATION NO. : 11/123876
DATED           : June 9, 2009
INVENTOR(S)     : Jerome A Legerton, Barry Chen and Joe Collins It is certified that error appears in the above-identified patent and that said Letters Patent is hereby corrected as shown below:

On Title page 2, column 2, line 31, please delete "Internatinal" and insert -- International --, therefor.

On Title page 2, column 2, line 31, please delete "Appliction" and insert -- Application --, therefor.

In the Specifications
At column 11, line 21, please delete "only. shows" and insert -- only shows --, therefor.

In the Claims
At column 15, line 63, in Claim 6 please delete "30×10⁻₁₁[cm³/sec][ml O₂/ml mm Hg]" and insert -- $30 \times 10^{-11}$ [cm²/sec][ml O₂/ml mm Hg] --, therefor.

Signed and Sealed this
Sixth Day of May, 2014

Michelle K. Lee
*Deputy Director of the United States Patent and Trademark Office*